United States Patent [19]
York et al.

[11] 4,244,049
[45] Jan. 6, 1981

[54] METHOD AND APPARATUS FOR ENHANCING I/O TRANSFERS IN A NAMED DATA PROCESSING SYSTEM

[75] Inventors: Kenneth L. York, Huntingdon Valley; Peter R. Annal, West Chester; John E. Legory, Paoli, all of Pa.

[73] Assignee: Burroughs Corporation, Detroit, Mich.

[21] Appl. No.: 9,250

[22] Filed: Feb. 2, 1979

[51] Int. Cl.³ .............................................. G06F 11/10
[52] U.S. Cl. .................................... 371/38; 364/900
[58] Field of Search ............. 235/312; 340/146.1 AL; 364/200, 900; 371/38, 37

[56] References Cited
U.S. PATENT DOCUMENTS

| | | | |
|---|---|---|---|
| 3,825,893 | 7/1974 | Bossen et al. | 340/146.1 AL |
| 3,920,976 | 11/1975 | Christensen et al. | 235/312 |
| 4,020,459 | 4/1977 | Coomer | 235/312 |
| 4,166,211 | 8/1979 | York et al. | 364/200 |

*Primary Examiner*—Charles E. Atkinson
*Attorney, Agent, or Firm*—K. R. Peterson; E. M. Chung; L. C. Brenner

[57] ABSTRACT

In a named data processing system, user ownership and verfication of data records is secured by assigning an unique record name to each data record, providing error checking covering both the data record and its associated record name, storing the data record, its associated record name and check code, and requiring the data record name to be provided in order to initiate a fetch operation. Further, the check code enables upon fetching, a verification that an incorrect data record was not inadvertantly fetched due to hardware or other failures. The association of a unique data name with each data record provides for self-descriptive data records thereby permitting the reconstruction of directories which describe the contents of various actual physical locations within an Input/Output system when such directions are lost or otherwise corrupted by hardware or other malfunctions.

4 Claims, 6 Drawing Figures

METHOD AND APPARATUS FOR ENHANCING I/O TRANSFERS IN A NAMED DATA PROCESSING SYSTEM

CROSS REFERENCE TO RELATED APPLICATION

In copending application, Ser. No. 893,068, for an "ERROR CONTROL SYSTEM FOR NAMED DATA", filed Apr. 3, 1978, in the names of K. L. York et al, and assigned to the assignee of the present invention, there is disclosed an error control system for named data. Although not limited particularly thereto, the present invention is tailored to function in an I/O transfer capacity in such an error control system for named data environment.

BACKGROUND OF THE INVENTION

In the environment of a named data processing system, the present invention relates to an improved Input/Output data record transfer system using named records.

In an Input/Output data information transfer operation, data information is frequently transferred as records wherein each record may comprise one or more packets of information. Each record may also contain an error check code such as a Hamming Code or variation thereof to provide some means of assuring that the data information in the record was not corrupted by or during the transfer.

In prior art Input/Output data information operation, an error check code could indicate that its associated record was error free even though the wrong record was being transferred due to hardware or other errors involved in addressing or fetching the desired record to be transferred. Also, in some prior art systems, any user could fetch any record merely by knowing the records storage address or by requesting a dump from a data storage unit.

Therefore, to avoid the above-mentioned and other problems associated with prior art Input/Output data transfer systems, the present invention operates to append an unique identification called a name to each record. The appended name becomes a permanent part of the record regardless of where the record is physically located throughout the Input/Output system. Records may be stored and fetched by name only. Further, each error check code associated with a record is expanded to cover also the record's name. Thus, verification is made that the record requested was indeed the record transferred. Privacy and ownership of the information contained in the record is enhanced as the record may be accessed only by one knowing its name.

Since a unique record name is appended to each record, the record is in essence, self-descriptive. Thus, if a directory relating record names to actual physical storage locations of the records were destroyed by hardware or other failures, the directory could be reconstructed by reading the records from storage and recording the information relating actual storage locations and stored record names and records therein.

Therefore it is an object of the invention to provide an Input/Output data transfer method and apparatus providing a high degree of privacy and user ownership of the data being transferred.

It is another object of the invention to provide an automatic identification and verification of data records being transferred through a data Input/Output system.

It is yet another object of the invention to provide unique and permanent identification for each record being transferred through a data Input/Output transfer system and to provide for an error checking operation covering both the record and its unique identification.

SUMMARY OF THE INVENTION

In carrying out the above and other objects of the present invention, a unique identification called a name is appended to each data record transferred through an Input/Output data transfer system in a named data processing environment. Each name so appended becomes a permanent part of its associated record. Each record is stored or fetched by name regardless of its actual physical location. An error check code for the record covers the appended name also to give verification that not only is the record error-free but also that the correct record is being fetched or stored. Records may be fetched or stored by name only thereby providing a high degree of privacy and user ownership.

The system configuration and operational details given above have been presented in simplified form. Other objects, features, and advantages of the invention will be apparent from the following description of the preferred embodiment of the invention and the accompanying drawings thereof.

DESCRIPTION OF THE PREFERRED EMBODIMENT

Before detailing the expanded I/O data transfer capability for named data records of the present apparatus and method, it will be beneficial to consider the fetching, storing and checking operations within a named data system.

A named data system functions for both storing and fetching operations. For purposes of illustration, the storing operation will be detailed first followed by a description of the fetching operation.

Figure 1:
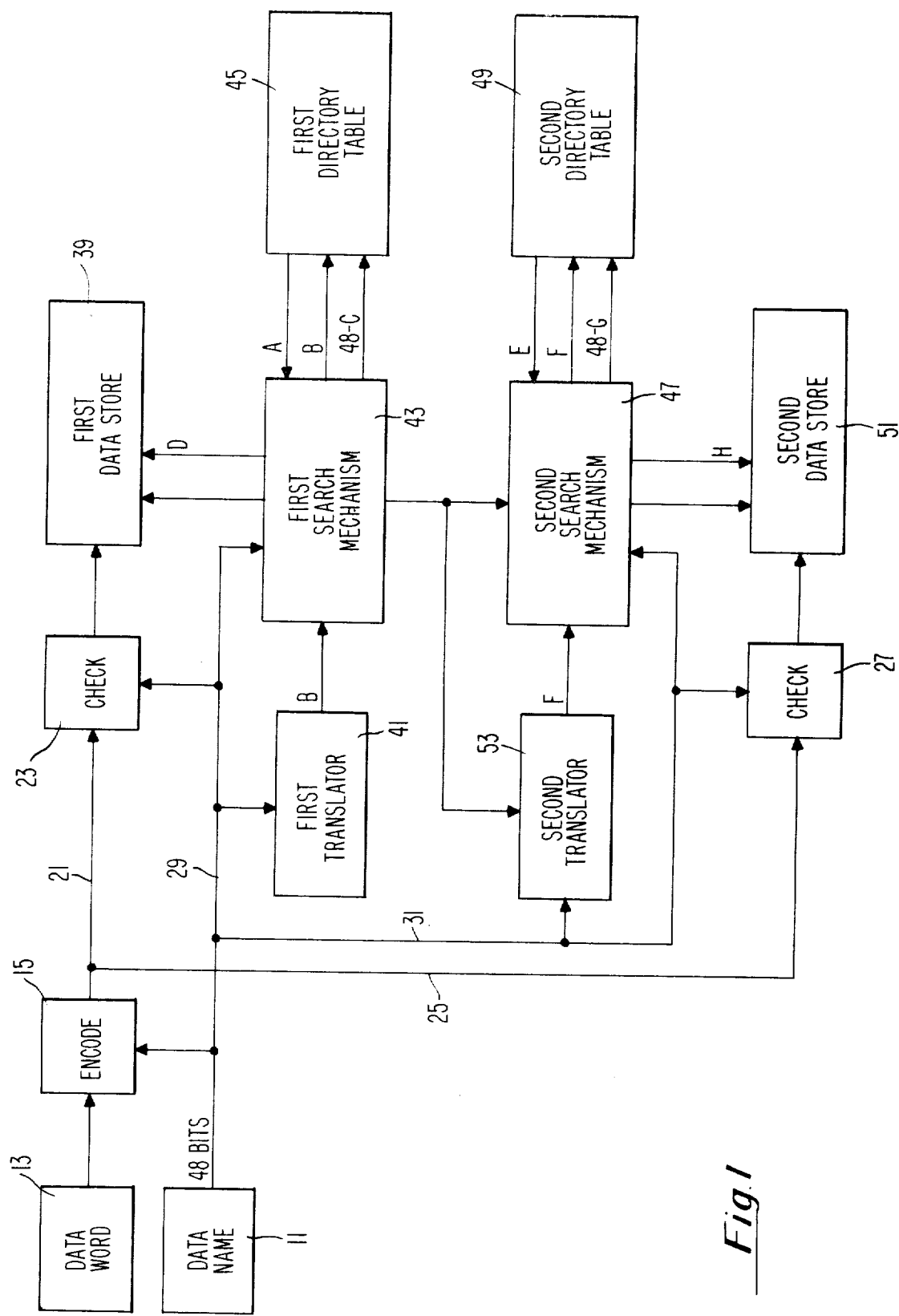
FIG. 1 is a diagram depicting a data word storing operation in a named data system.

With reference to FIG. 1, it can be seen that a data name source device 11 is associated with a data word source device 13. Whenever a new data word (or program variable) is created by the data word source device 13, the data name source device 11 generates a unique name to be permanently associated therewith. As used herein "data" is synonymous with "information" and in the preferred embodiment, a data word is 54 bits in length and a data name is 48 bits long.

Figure 2:
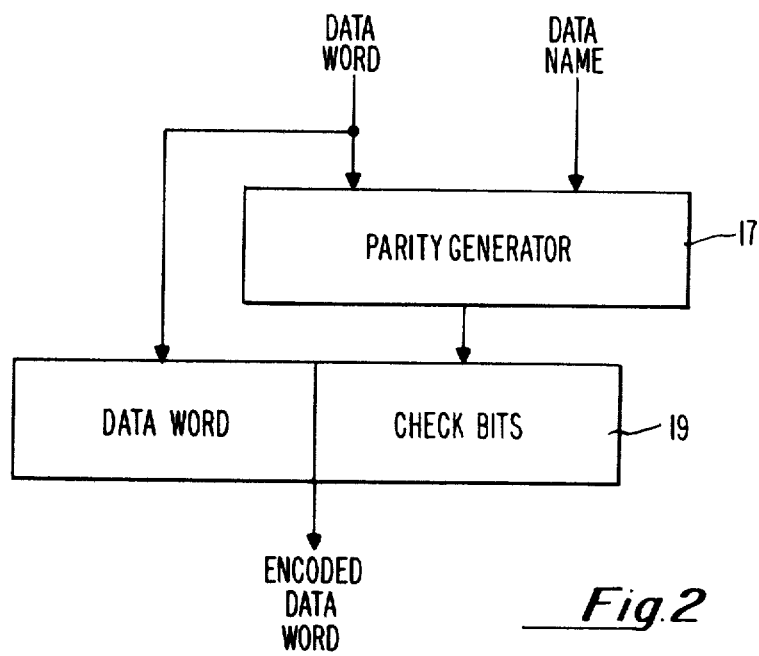
FIG. 2 is a diagram showing an encoder used in the system of FIG. 1.

New data word values and their names are fed to an encoder 15. The encoder 15, see FIG. 2, includes a parity generator circuit 17 which generates check bits for either a pure error detection code or preferably a combined detection and correction code (e.g., a Hamming type code). In the preferred embodiment the encoder 15 generates a 10-bit combined detection and correction code. The encoder 15 outputs from a store register 19 a concatenated encoded word comprising the 54-bit data word and the generated 10-bit parity check.

With reference again to FIG. 1, the encoder 15 feeds its outputs through a first transmission line 21 to a first checking circuit 23 and through a second transmission line 25 to a second checking circuit 27. Also fed along third and fourth transmission lines 28 and 30 to the first and second checking circuits 23 and 27 is the 48-bit data name associated with the encoded data word fed on the first and second transmission lines 21 and 25.

Figure 3:
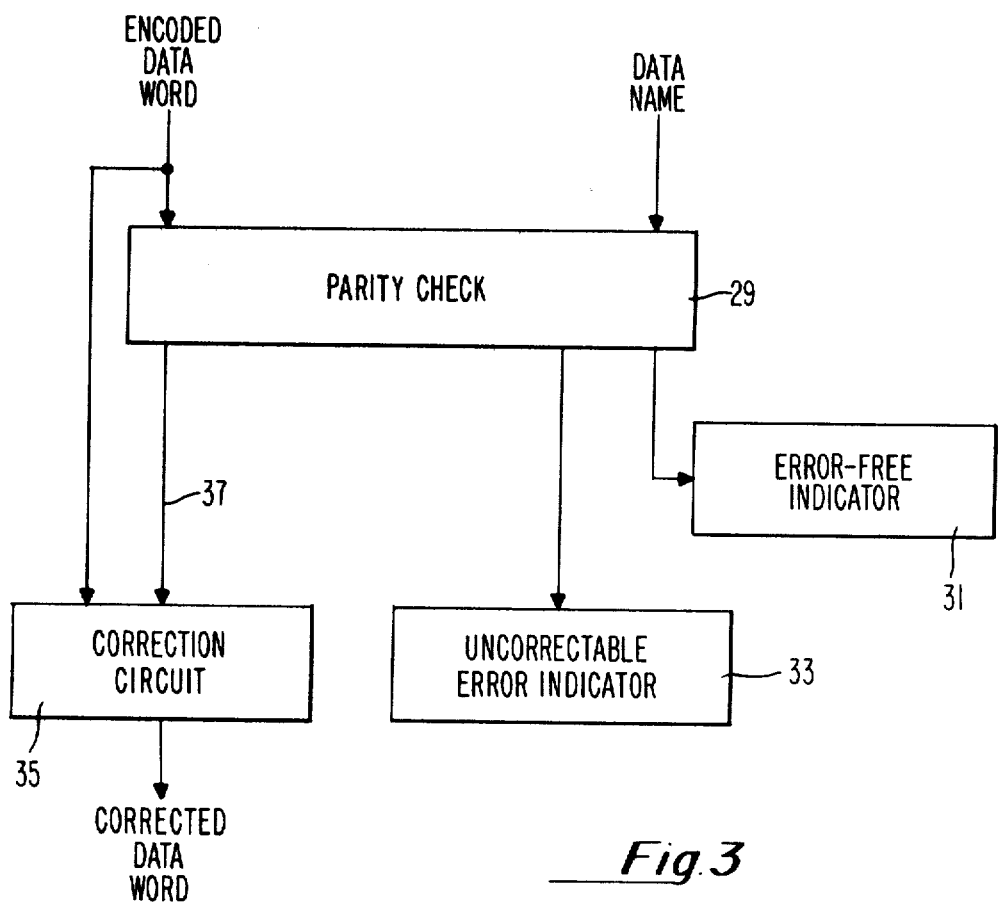
FIG. 3 is a diagram illustrating a checker having error correction capabilities used in the system of FIG. 1.

The first and second checking circuits 23 and 27 are identical, see FIG. 3, and in the preferred embodiment include a parity checking circuit 29, an error-free indicator circuit 31, an uncorrectable error indicator circuit 33, and a correction circuit 35. The parity checking circuit 29 receives the 64 encoded word bits from the store register 19 in the encoder 15 and the associated 48 data name bits. Parity checking is performed upon the received bits and as a result thereof an indication or flag is sent when appropriate to an error-free indication circuit 31 which functions in effect to indicate "everything is O.K., proceed with storing operation". Conversely, if an even error or other uncorrectable error is uncovered by the parity checking circuit 29, then an indication or flag is sent to the uncorrectable error indicator 33 to initiate appropriate action thereto. Finally, the 64 encoded data word bits are fed to an error correction circuit 35 which also receives error bit location information from the parity checking circuit 29 when a correctable error is uncovered therein. The correction circuit 35 corrects the erroneous bit at the bit location received and outputs a corrected data word for further processing. Only the data word and not the data name is corrected (if correctable) by the correction circuit 35.

With reference again to FIG. 1, once a data word is checked through the first checking circuit 23, it is ready for storage in the first data storing means 39. The first data storing means 39 is a relatively small, high speed memory and is physically implemented with high speed devices such as bi-polar devices.

Addressing for the first storage memory 39 is derived by a first translator 41 from the 48-bit data name associated with the data word to be stored. Storage memory 39 contains 2 raised to the power "D" word locations. Thus, the physical address of the data word to be stored in storage memory 39 is specified by a D-bit address field wherein D is less than 48, the data name length in bits. The D-bit address field is comprised of three subfields which are A, B, and C bits in length, respectively. Suitable values for A, B, C and D are 2, 7, 3 and 12 bits each respectively. However, different values may be chosen to suit various embodiments and first storage memory 39 sizes. The A subfield represents the high order bits of the D field and C the low order bits. The translator 41 operates upon the received 48-bit data name and outputs a B-bit address which specifies not a specific address location in the first storage memory 39 but rather a plurality of such addresses which may be considered a portion (or a class) of the memory 39. The translation performed in the first translator 41 may be a simple B-bit truncation of the 48-bit data name input, or it may be performed by means of a translation algorithm developed to satisfy a particular application or environmental criteria. It is important to the preferred embodiment only that a 48-bit data name input be translated into a particular associative B-output which represents an area of storage in the first storage means 39.

The first translator 41 feeds the B-bit output field to the first search mechanism 43 which also receives the associated 48-bit data name. The data name is used in searching a directory table 45 which keeps track of groups (pages) of data names stored in the first data storing means 39.

The search is done on the high order 48-C bits of the data name and the area of the directory table that is searched is specified by the B-bit field. All data names having in common their first 48-C bits belong to the same page. The output of the search operation is the A-bit address which locates the desired data name page relative to the specified class in the directory table 45. There are 2 raised to the power "A" page locations per class in the directory table 45. The desired data name is specified relative to its page by the C-bit field. The C-bit field is comprised of the C low order bits of the 48-bit data name. The physical address of the data name to be stored in memory 39 is now completely specified by the D-bit (D=A+B+C) address output from the search mechanism 43 and the translator 41.

If the page to which the data name to be stored belongs is found by search mechamism 43, then the associated data word is written into the first memory 39 at the address specified by the D-bit output from search mechanism 43 and translator 41. If the page is not present in directory table 45, then an attempt is made to locate the page of data words in the next lower level of memory, namely the second data storing means 41, and to bring the page of data words to first memory 39 and the page name to directory table 45. To make room, vacant positions in both first memory 39 and first directory table 45 are located or if necessary created. In directory table 45 one vacant space must be made available among the 2 raised to the power "A" page name entries in the class specified by the B-bit field output from first translator 41. In first memory 39, 2 raised to the power "C" vacant spaces must be made available for the page of data words containing the data word location to which the store will be made. If a vacancy does not already exist in first memory 39, a vacancy is created by selecting from first directory table 45 a page name to be removed. The algorithm used for the selection process may be either the least-recently-used replacement algorithm or the random replacement algorithm, or any other algorithm well known in the literature.

The page of data words in first memory 39 corresponding to the page name selected for replacement can simply be erased if a copy of them exists in a lower level of memory. If a copy does not exist elsewhere, then the page must be transferred to second memory 51 for storage at addresses specified by 2 raised to the power "C" H-bit addresses wherein H=E+F+G and "H" is less than 48. The address subfields E, F, and G are similar respectively to subfields A, B, and C in the first level of memory; however, the magnitudes differ respectively from those of A, B, and C. Suitable values have been found to be H=19, E=6, F=6, and G=7. Different values may of course be found advantageous in alternate embodiments. The attempted store operation to second memory 51 is handled in the same way that store operations to the first memory 39 are handled. At the second level or some lower level of memory space will be found for storing the page of data words displaced from first memory 39. When this operation is completed the page of 2 raised to the power C data words containing the originally referenced data word are located in second memory 51 (or if not there a lower level of memory) and transferred to first memory 39. First directory table 45 is then updated with the inclusion of the page name of the page of data words just stored in first memory 39. The store operation to the originally referenced data word location can now be completed.

The second storage means 51 is similar in nature and operation to the first data storing means 39 except that the second data storage means 51 is a larger, generally slower, and therefore, less expensive on a per-bit basis than the first storage means 39. The second data storage means 51 has associated with it a second search mechanism 47, a second directory table 49, and a second translator 53. The second search mechanism 47, directory table 49, and translator 53 function in a manner identical to that described for the first translator 41, first search mechanism 43, and first directory table 45. Also associated with the data storing means 51 is a second checking circuit 27 which functions identically to the first checking circuit 23.

Each level of memory in this invention has a different physical address for the same data name, yet only one encoding performed by encoder 15 is necessary when a new data word is created and stored. A separate code checker (first code checker 23 and a second code checker 27) is used at the end of transmission just prior to the actual store operation.

Figure 4:
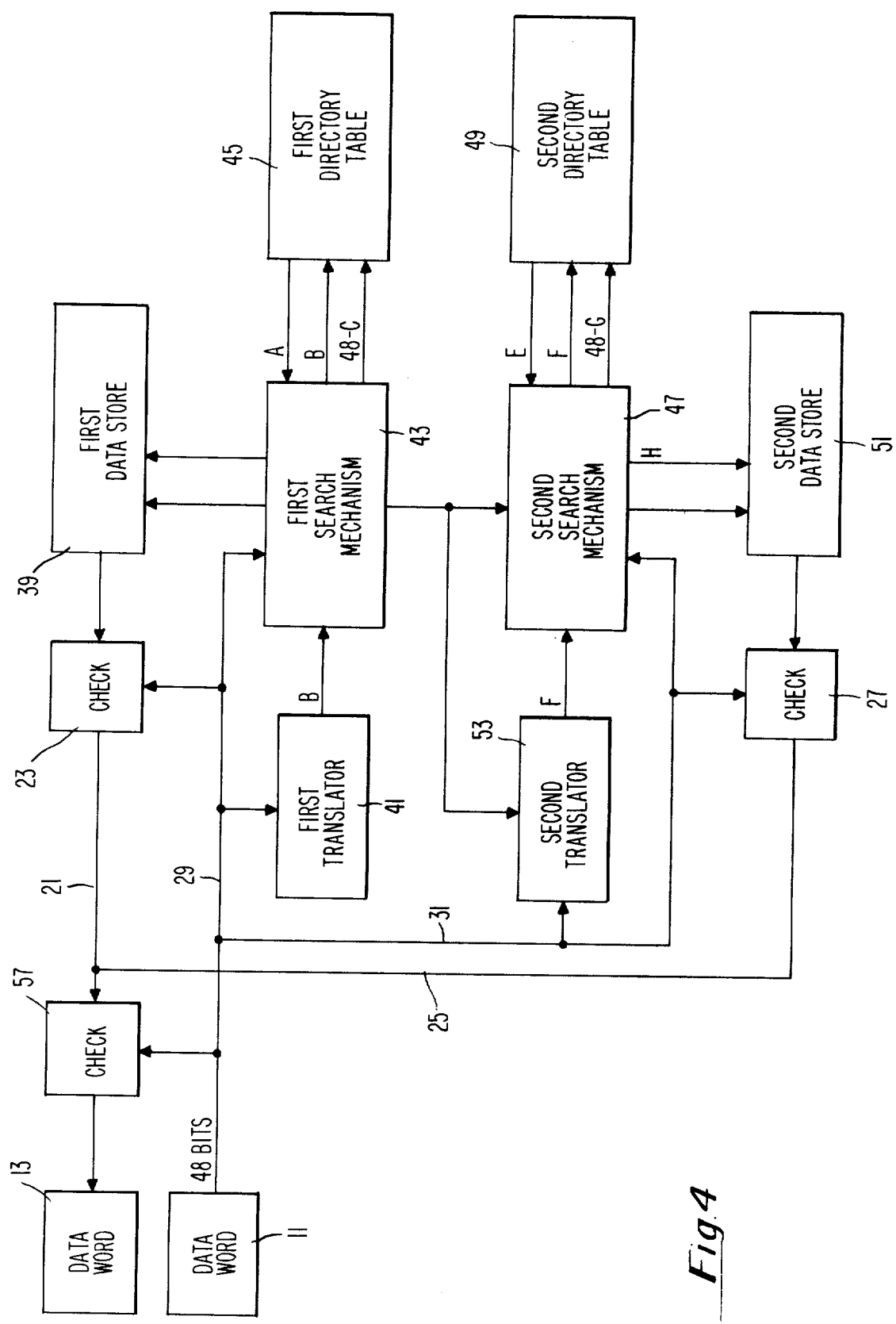
FIG. 4 is a diagram depicting a data word fetching operation in a named data system of the present invention.

Comparing now FIG. 4 with FIG. 1, it can be seen that a fetch operation requires the same circuitry as a store operation with the exception that a third checking circuit 57 replaces the encoder 15. The third checking circuit 57 functions identically to the first and second checking circuits 23 and 27. The fetch operation functions in a manner similar to the above-described store operation. To fetch a data word, the associated data name is transmitted to the first translator 41 which generates in effect, information relating to that portion of the first directory table 45 which should be searched to find that data name. The first search mechanism 43 then performs that search and if the data name is found in a first directory table 45, its location in the data storing means 39 is used to fetch the associated data word from the first data storing means 39 and back through the second checker 23 to the first transmission line 21, to the third checking circuit 57 and finally to the data word source 13. If the data name is not in the first directory table 45, a search begins through the second directory table 49 to locate its page in the second storage means 51. It is appreciated that for purposes of program initiation, all data names are stored before the running of a program in the lowest order directory table.

Although the illustrations of the above-described embodiment show only two levels of memory storage, it is appreciated that the principles utilized may be extended to three or more levels of storage. Furthermore, other modifications and embellishments may be made to the above-described embodiment as desired for particular applications. For example, elegant replacement or swapping algorithms or means may be included for swapping data back and forth between the first data storing means 39 and the second data storing means 51. Also, if desired, data could be written into both data storing means 39 and data storing means 51 in a single operation. It should be further understood that the word size, name size, and data storing means sizes are provided for means of illustration only. Obviously, larger or smaller named data systems may be developed as desired.

Figure 5:
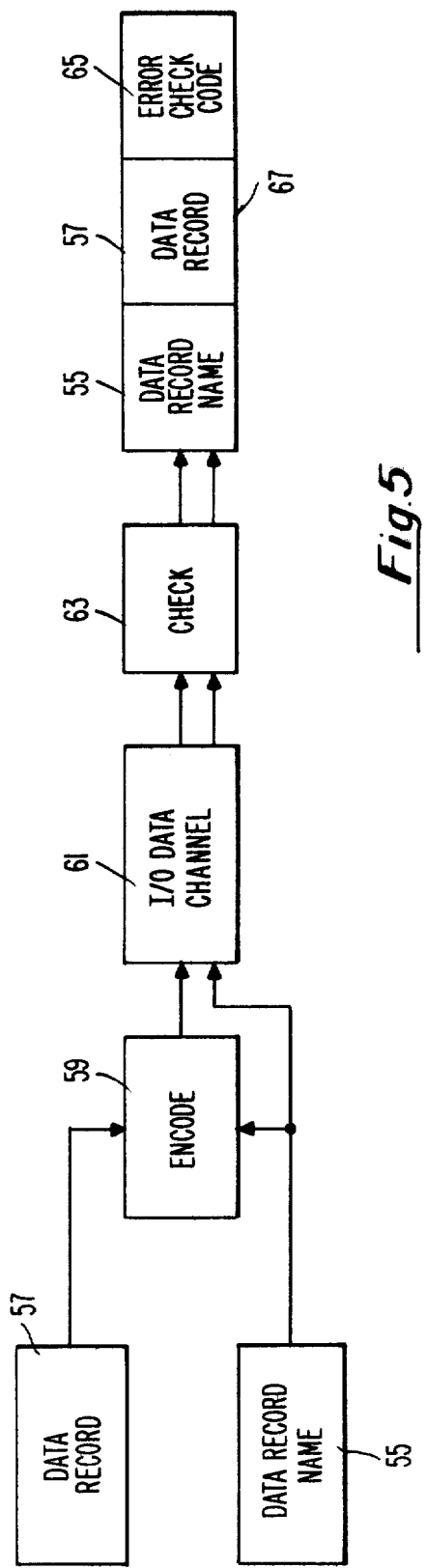
FIG. 5 is a diagram depicting a named data record storing I/O operation through the expanded data transfer method and apparatus of the present invention.

The above-described methods and apparatuses may be expanded and developed into an Input/Output data communications system in order to expand and enhance capability of the I/O transfer mechanism, see FIG. 5. A stored data record and a stored data name are combined in an encoder 57 before being transferred to an I/O data channel 61. A data record 57 in the preferred embodiment will consist of one or more packets of information. A data record name 55 will be unique identification for a given data record 57 in the matter that a data name 11 provided a unique identification for a data word 13. Likewise, the encoder 59 functions to provide an error check code covering the data record 57 and it's associated data record name 55 in a manner similar to which the encoder 15 provides a check code for the data word 13 and it's associated data name 11, see FIG. 1. With reference again to FIG. 5, the encoded data record 57 and data record name 55 are fed through I/O data channels 61 to a check circuit 63. The data record name 55 is also supplied independently to the check circuit 63, wherein a check is made on the check code covering both the data record 57 and the data record name 55, in a manner which the check circuit 23 provided a check against the accuracy of the data word 13 and the data name 11, as shown in FIG. 1. Once the check is made and accuracy verified by the check circuit 63, the concantenated data record name 55 data record 57, and data check code 65 is stored as a complete data record unit 67.

Figure 6:
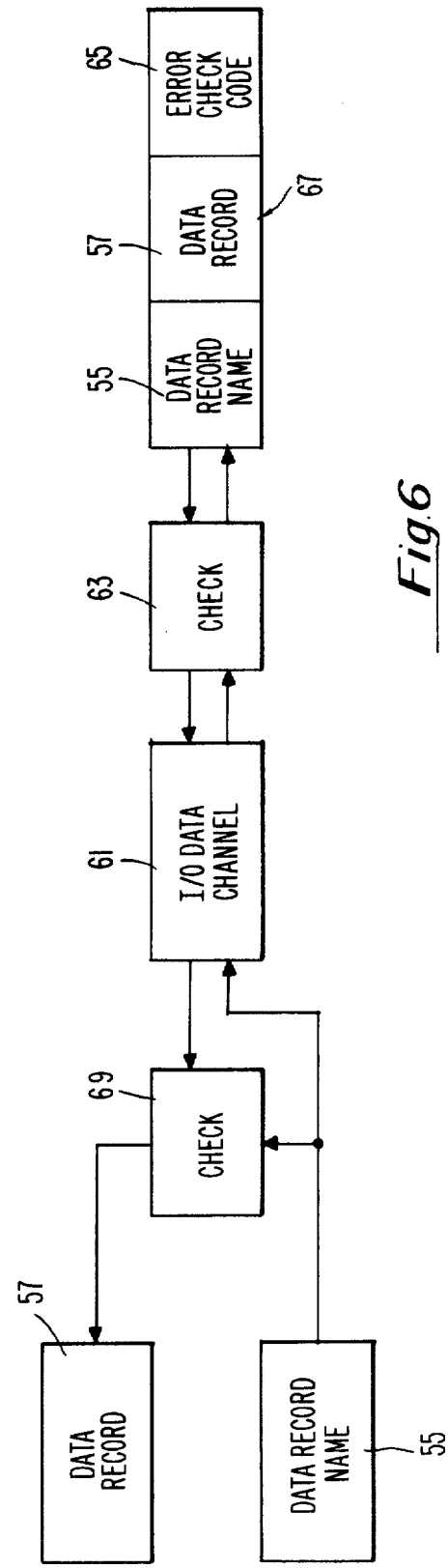
FIG. 6 is a diagram depicting a named data record fetching I/O operation through the expanded data transfer method and apparatus of the present invention.

A data record is retrieved in a manner similar to which it is stored, see FIG. 6. A data record unit 67 comprising a data record name 55, data record 57, and error check code 65 is requested by name from a data record name source 55. The data record unit is checked through a check circuit 63 which corresponds in function and operation and structure to the checking circuit 27 shown in FIG. 4. With reference again to FIG. 6, once a check is made on the record unit 67, it is passed through the I/O data channel 61 to another checking circuit 69 which corresponds in operation, structure and function to the checking circuits 57 of FIG. 4. Note, in FIG. 6, that the check circuit 69 receives a data record name 55 to check that the data record 57 received is not only error-free but that it is indeed the correct record requested. Once checking is verified through check circuit 69, the data record 57 is returned to storage.

Thus, it is seen that in the preferred embodiment, data records 57 are branded by data record names 55 via an automated process which is or may be transparent to the users of data records 57. The data record name 55 then becomes a permanent part of that data record 57, thus providing a capability for automatic checking and verification of the data record name 55 upon read-back.

Thus, only one knowing the specific data record name 55 of a specific data record 57, may achieve access to that specific data record 57. It is understood that the encoding process of the encoder 59 as shown in FIG. 5, and the checking circuits 63 and 69 of FIG. 6 provide for error detection upon both the data record 57 and the data record name 55 but would only provide data correction upon the data record 57, since there would be no advantage in correcting an incorrect data record name 55 and indeed such a correction would defeat certain of the security and privacy benefits of the subject invention.

While the invention has been particularly shown and described with reference to a preferred embodiment, it will be understood by those skilled in the art that various changes in form and detail may be made therein without departing from the spirit of the invention.

What is claimed is:

1. In a named data processing system, a method for securely storing a data record through an Input/Output channel comprising the steps of:
    appending a unique permanent record identification to said data record;
    generating an encoded check code covering said data record and said appended unique permanent record identification;
    appending said encoded check code to said data record and said appended unique permanent record identification;
    transferring said data record, said appended unique permanent record identification and said appended encoded check code through said Input/Output channel;
    supplying independently for verification purposes said unique permanent record identification;
    checking said transferred data record and said appended unique permanent identification by decoding said appended encoded check code and by verifying that said appended unique permanent record identification is identical to said independently supplied unique permanent record identification; and
    storing said checked data record with said appended unique permanent identification and said appended encoded check code.

2. In a named data processing system, a method for fetching from a store and through an Input/Output channel a data record having an appended unique record identification and an appended check code covering both the data record and the appended unique record identification, said method comprising the steps of:
    fetching from said store said data record having said appended unique record identification and said appended encoded check code;
    supplying independently for verification purposes said unique permanent record identification;
    checking said fetched data record and said appended unique record identification by decoding said appended encoded check code and by verifying that said appended unique permanent record identification is identical to said independently supplied unique permanent record identification;
    transferring through said Input/Output channel said checked data record, said appended unique permanent identification, and said appended encoded check code; and
    rechecking said transferred data record and said appended unique permanent record identification by decoding said transferred encoded check code and by verifying that said transferred appended unique permanent record identification is identical to said independently supplied unique permanent record identification.

3. In a named data processing system an apparatus for securely storing a data record through an Input/Output channel comprising:
    appending means for appending a unique permanent record identification to said data record;
    generating means data communicatively coupled to said appending means and receiving therefrom said data record and said appended unique permanent record, said generating means for generating an encoded check code covering said data record and said appended unique permanent record identification, said generating means including encode means for appending said encoded check code to said data record and said appended unique permanent record identification;
    transfer means data communicatively coupled to said generating means and receiving therefrom said data record, said appended unique permanent record identification and appended encoded check code, said transfer means for transferring said data record, said appended unique permanent record identification and said appended encoded check code through said Input/Output channel;
    supply means supplying independently for verification purposes said unique permanent record identification;
    checking means data communicatively coupled to said transfer means and receiving therefrom said transferred data record, said appended unique permanent record identification and said appended encoded check code, said checking means also data communicatively coupled to said supply means and receiving therefrom said independently supplied unique permanent record identification, said checking means for checking said transferred data record and said appended unique permanent identification by decoding said encoded check code and by verifying that said appended unique permanent record identification is identical to said independently supplied unique permanent record identification; and
    store means data communicatively coupled to said checking means and receiving therefrom said checked data record with said appended unique permanent identification and said appended encoded check code, said store means for storing said checked data record with said appended unique permanent identification and said appended encoded check code.

4. In a named data processing system, an apparatus for fetching from a store and through an Input/Output channel a data record having an appended unique record identification and an appended encoded check code covering both the data record and the appended unique record identification, said apparatus comprising:
    fetch means data communicatively coupled to said store for fetching from said store said data record having said appended unique record identification and said appended encoded check code;
    supply means supplying independently for verification purposes said unique permanent record identification;
    check means data communicatively coupled to said fetch means and receiving therefrom said fetched data record, said appended unique permanent record identification and said appended encoded check code, said checking means also data communicatively coupled to said supply means and receiving therefrom said independently supplied unique permanent record identification; said check means for checking said fetched data record and said appended unique record identification by decoding said appended encoded check code and by verifying that said appended unique permanent record identification, is identical to said independently supplied unique permanent record identification;

transfer means data communicatively coupled to said check means and receiving therefrom said checked data record, said appended unique permanent record identification and appended encoded check code, said transfer means for transferring through said Input/Output channel said checked data record, said appended unique permanent identification, and said appended encoded check code; and recheck means data communicatively coupled to said transfer means and receiving therefrom said transferred data record, said appended unique permanent record identification and said appended encoded check code, said checking means also data communicatively coupled to said supply means and receiving therefrom said independently supplied unique permanent record identification, said recheck means for rechecking said transferred data record and said appended unique permanent record identification by decoding said transferred encoded check code and by verifying that said transferred appended unique permanent record identification is identical to said independently supplied unique permanent record identification.

* * * * *